United States Patent
Cudak et al.

(10) Patent No.: US 9,207,804 B2
(45) Date of Patent: Dec. 8, 2015

(54) SYSTEM AND METHOD FOR ALTERING INTERACTIVE ELEMENT PLACEMENT BASED AROUND DAMAGED REGIONS ON A TOUCHSCREEN DEVICE

(71) Applicant: LENOVO ENTERPRISE SOLUTIONS (SINGAPORE) PTE. LTD., New Tech Park (SG)

(72) Inventors: Gary D Cudak, Creedmoor, NC (US); Christopher J Hardee, Raleigh, NC (US); Adrian X Rodriguez, Durham, NC (US); Philip L Weinstein, Apex, NC (US)

(73) Assignee: Lenovo Enterprise Solutions PTE. LTD., Singapore (SG)

( * ) Notice: Subject to any disclaimer, the term of this patent is extended or adjusted under 35 U.S.C. 154(b) by 104 days.

(21) Appl. No.: 14/149,688

(22) Filed: Jan. 7, 2014

(65) Prior Publication Data

US 2015/0193074 A1  Jul. 9, 2015

(51) Int. Cl.
*G06F 3/041* (2006.01)
*G06F 3/0481* (2013.01)
*G06F 3/0482* (2013.01)
(Continued)

(52) U.S. Cl.
CPC ............ *G06F 3/0418* (2013.01); *G06F 3/0412* (2013.01); *G06F 3/0482* (2013.01); *G06F 3/0484* (2013.01); *G06F 3/0488* (2013.01); *G06F 3/04817* (2013.01);
(Continued)

(58) Field of Classification Search
CPC ..... G06F 3/041; G06F 3/0416; G06F 3/0418; G06F 3/0488; G06F 3/0412; G06F 3/04817; G06F 3/04845; G06F 3/0484; G06F 11/07; G06F 11/22
See application file for complete search history.

(56) References Cited

U.S. PATENT DOCUMENTS 4,931,782 A    6/1990  Jackson
4,992,779 A *  2/1991  Sugino et al. ................. 345/173
(Continued)

FOREIGN PATENT DOCUMENTS

JP    2010020657 A    1/2010

OTHER PUBLICATIONS

Cracked phone made my finger bleed?, http://answers.yahoo.com/question/index?qid=20110501193809AAxvXT0, Jan. 2011.
(Continued)

*Primary Examiner* — Lun-Yi Lao
*Assistant Examiner* — Peter D McLoone
(74) *Attorney, Agent, or Firm* — Kunzler Law Group; Katherine Brown

(57) ABSTRACT

An apparatus for avoiding a damaged region on a touchscreen is disclosed. A method and a computer program product also perform the functions of the apparatus. The apparatus includes a damage location module that determines a location of an area of damage on a touchscreen of a computing device. The area of damage includes damage to the touchscreen. The apparatus, in one embodiment, includes a display location module that determines a location of one or more display items commanded to be displayed on the touchscreen. Each display item includes a location to be displayed on the touchscreen. The apparatus includes, in one embodiment, a rearrangement module that alters a location of a display item to be displayed in the area of damage where the display item is moved to a location on the touchscreen outside the area of damage on the touchscreen.

30 Claims, 5 Drawing Sheets

(51) Int. Cl.
  *G06F 3/0484* (2013.01)
  *G06F 3/0488* (2013.01)
  *G06F 11/07* (2006.01)
  *G06F 11/22* (2006.01)

(52) U.S. Cl.
  CPC ........... *G06F 3/04845* (2013.01); *G06F 11/07* (2013.01); *G06F 11/22* (2013.01)

(56) References Cited

U.S. PATENT DOCUMENTS

| | | | |
|---|---|---|---|
| 6,259,044 | B1 | 7/2001 | Paratore et al. |
| 7,962,629 | B2 | 6/2011 | Bigioi et al. |
| 8,359,541 | B1 | 1/2013 | Landry |
| 8,514,195 | B2 | 8/2013 | Arnold et al. |
| 8,525,796 | B2 * | 9/2013 | Arnold et al. ................. 345/173 |
| 8,648,850 | B2 * | 2/2014 | Kim ................................ 345/214 |
| 8,963,875 | B2 * | 2/2015 | Sugiura et al. ................. 345/174 |
| 2008/0238936 | A1 * | 10/2008 | Kim ................................ 345/618 |
| 2009/0160780 | A1 * | 6/2009 | Arnold et al. ................. 345/173 |
| 2009/0265644 | A1 | 10/2009 | Tweed et al. |
| 2010/0138680 | A1 * | 6/2010 | Brisebois et al. ............. 713/324 |
| 2011/0291974 | A1 * | 12/2011 | Son et al. ....................... 345/173 |
| 2012/0105358 | A1 | 5/2012 | Momeyer et al. |
| 2012/0146924 | A1 * | 6/2012 | Inoue ............................ 345/173 |
| 2012/0223904 | A1 * | 9/2012 | Arnold et al. ................. 345/173 |
| 2012/0249470 | A1 * | 10/2012 | Sugiura et al. ................. 345/174 |
| 2013/0022274 | A1 | 1/2013 | Lawrence Ashok Inigo et al. |
| 2013/0082843 | A1 | 4/2013 | Wurzel et al. |
| 2013/0100037 | A1 * | 4/2013 | Mabie et al. ................. 345/173 |
| 2013/0152001 | A1 * | 6/2013 | Lovitt et al. ................... 715/765 |
| 2014/0146070 | A1 * | 5/2014 | Liu et al. ....................... 345/589 |
| 2014/0152583 | A1 * | 6/2014 | Bastide et al. ................. 345/173 |
| 2014/0320437 | A1 * | 10/2014 | Kang ............................ 345/173 |

OTHER PUBLICATIONS

Dallas Chambers, Did You Know the iPhone 4 Can Be Dangerous?, http://kissfm969.com/did-you-know-the-iphone-4-can-be-dangerous/, Apr. 26, 2012.

Titus, Christa, The Dangers of a Cracked Phone Screen, http://www.ehow.com/info_12037798_dangers-cracked-phone-screen.html, Last retrieved: May 2013.

* cited by examiner

SYSTEM AND METHOD FOR ALTERING INTERACTIVE ELEMENT PLACEMENT BASED AROUND DAMAGED REGIONS ON A TOUCHSCREEN DEVICE

FIELD

The subject matter disclosed herein relates to touchscreen damage and more particularly relates to placement of display items on a touchscreen to avoid an area of damage.

BACKGROUND

Many computing devices, such as a smartphone, a camera, a music player, etc., now use a touchscreen to allow a user to input information. The touchscreen may allow the user to launch applications, to type on a virtual keyboard, to drag and drop display items, to zoom, and to carry out many other functions using the touchscreen. A user may use a finger, a stylus, a glove with a special coating, etc. to manipulate the display items.

However, touchscreens may be damaged. For example, the user may drop the computing device causing the touchscreen to crack. In another example, the user may press something against the touchscreen causing damage. In some cases the computing device continues to operate, however, the touchscreen is affected since some display items appear in the area of damage. In addition, a user may slide a finger across the area of damage and the user's finger may be cut.

BRIEF SUMMARY

An apparatus for avoiding a damaged region on a touchscreen is disclosed. A method and a computer program product also perform the functions of the apparatus. The apparatus includes a damage location module that determines a location of an area of damage on a touchscreen of a computing device. The area of damage includes damage to the touchscreen. The apparatus, in one embodiment, includes a display location module that determines a location of one or more display items commanded to be displayed on the touchscreen. Each display item includes a location to be displayed on the touchscreen. The apparatus includes, in one embodiment, a rearrangement module that alters a location of a display item to be displayed in the area of damage where the display item is moved to a location on the touchscreen outside the area of damage on the touchscreen.

In one embodiment, the damage location module includes a photograph module that receives a photograph of the touchscreen, and a photo damage module that determines from the photograph the area of damage on the touchscreen. In a further embodiment, the photograph module further includes taking a photograph of the touchscreen in response to a user positioning the computing device in front of a mirror and pressing a photograph button. In another embodiment, the damage location module includes a damage sensor module that determines the area of damage using one or more sensors in the touchscreen. The one or more sensors detect damage to the touchscreen. In another embodiment, the damage location module includes a manual damage module that receives input from a user defining the area of damage.

In one embodiment, the display item to be displayed in the area of damage includes an icon and/or a screen element and the rearrangement module includes an icon rearrangement module that moves an icon and/or a screen element to be displayed in the area of damage to a location on the touchscreen outside the area of damage. In a further embodiment, the icon/screen element to be displayed in the area of damage is an icon/screen element used more than an icon/screen element outside the area of damage and the icon rearrangement module moves an icon and/or screen element used less than the icon/screen element to be displayed in the area of damage to the area of damage.

In one embodiment, the rearrangement module also locates a display item to the area of damage where the display item moved to the area of damage includes a display item that operates without user interaction through the touchscreen. In another embodiment, the rearrangement module includes a display resize module that resizes information to be displayed on the touchscreen to avoid the area of damage. In another embodiment, the display item to be displayed in the area of damage includes a window and the rearrangement module includes a window resize module that resizes the window to avoid the area of damage. In another embodiment, the rearrangement module includes a rotation module that rotates a display on the touchscreen independent of an accelerometer of the computing device, and after rotating the display, the display item to be displayed in the area of damage is located in an area outside the area of damage.

In one embodiment, the apparatus includes a distortion module that lowers an output resolution of a display item in the area of damage to a level to decrease distortion of the display item due to the damage. In another embodiment, the apparatus includes a damage display correction module that changes a font size and/or a color of a display item displayed in the area of damage to adjust for distortion due to the damage. In another embodiment, the apparatus includes a damage warning module that sends an alert in response to a user and/or an application attempting to locate a display item in the area of damage. In another embodiment, the apparatus includes the computing device, a processor in the computing device, and the touchscreen. The processor is operable to display the display items on the touchscreen.

A method for avoiding a damaged region on a touchscreen includes determining a location of an area of damage on a touchscreen of a computing device. The area of damage includes damage to the touchscreen. The method, in one embodiment, includes determining a location of one or more display items commanded to be displayed on the touchscreen. Each display item includes a location to be displayed on the touchscreen. The method, in one embodiment, includes altering a location of a display item to be displayed in the area of damage where the display item is moved to a location on the touchscreen outside the area of damage on the touchscreen.

In one embodiment, the method includes receiving a photograph of the touchscreen and determining from the photograph the area of damage on the touchscreen. In another embodiment, the method includes determining the area of damage using one or more sensors in the touchscreen. The one or more sensors detect damage to the touchscreen. The method may also include receiving input from a user defining the area of damage.

In another embodiment, the display item to be displayed in the area of damage includes an icon and/or a screen element and altering a location of a display item to be displayed in the area of damage includes moving an icon and/or a screen element to be displayed in the area of damage to a location on the touchscreen outside the area of damage. In another embodiment, altering a location of a display item to be displayed in the area of damage includes resizing information to be displayed on the touchscreen to avoid the area of damage. In another embodiment, the display item to be displayed in the area of damage includes a window and altering a location of a display item to be displayed in the area of damage includes resizing the window to avoid the area of damage. In another embodiment, altering the display item to be displayed in the area of damage includes rotating a display on the touchscreen independent of an accelerometer of the computing device. After rotating the display, the display item to be displayed in the area of damage is located in an area outside the area of damage.

A computer program product for avoiding a damaged region on a touchscreen includes a computer readable storage medium having program code embodied therein. The program code is readable/executable by a processor for determining a location of an area of damage on a touchscreen of a computing device, where the area of damage includes damage to the touchscreen. The program code is readable/executable by a processor for determining a location of one or more display items commanded to be displayed on the touchscreen, where each display item includes a location to be displayed on the touchscreen. The program code is readable/executable by a processor for altering a location of a display item to be displayed in the area of damage where the display item is moved to a location on the touchscreen outside the area of damage on the touchscreen.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
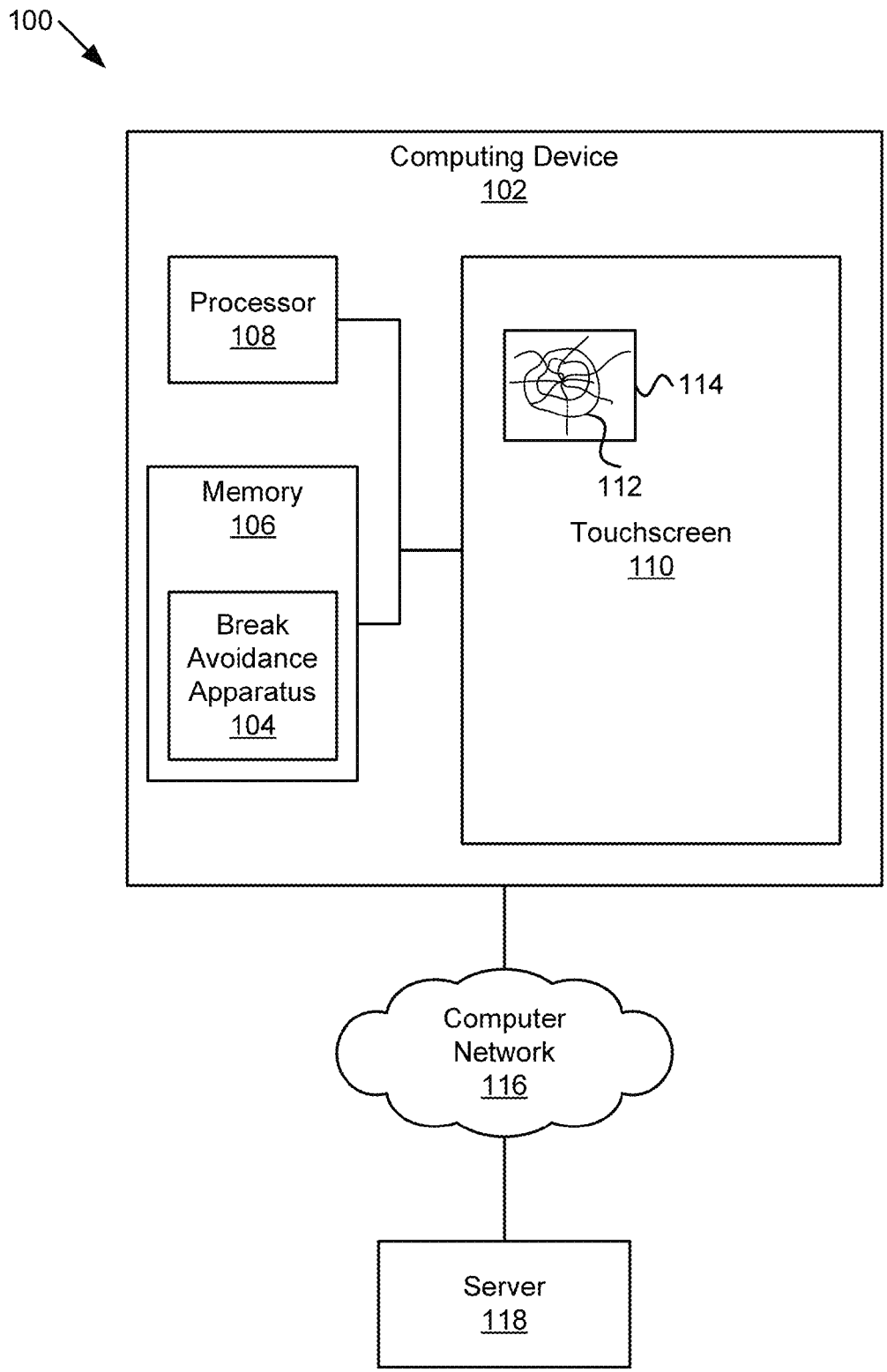
FIG. 1 is a schematic block diagram illustrating one embodiment of a system for avoiding a damaged region on a touchscreen, in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is a schematic block diagram illustrating one embodiment of a system 100 for avoiding a damaged region on a touchscreen, in accordance with one embodiment of the present invention. The system 100 includes a computing device 102 with a break avoidance apparatus 104, memory 106, a processor 108 and a touchscreen 110 with damage 112, and an area of damage 114, a computer network 116, an a server 118, which are described below.

The system 100 includes a computing device 102 with a touchscreen 110. In one embodiment, the touchscreen 110 is integrated into the computing device 102. For example, the touchscreen 110 may include a smartphone, a music/game playing device, such as an iPod®, a tablet computer, a laptop computer, a global positioning system ("GPS") device, a camera, a video recorder, or other device with a touchscreen 110. In another embodiment, the touchscreen 110 is controlled by the computing device 102 but is separate from the computing device 102. For example, the touchscreen 110 may be apart from the computing device 102, such as an electronic display at a kiosk or monitor for a desktop computer where the computing device 102 is connected with a cable or wirelessly.

The computing device 102 may include any device that controls and/or receives input from a touchscreen 110 and may come in various forms, such as a handheld device, a stationary device, a device that is mounted or incorporated into another device, etc. For example, the computing device 102 may be part of an appliance, a vehicle, a game system, etc. One of skill in the art will recognize other computing devices 102 that control and/or receive input from a touchscreen 110.

In one embodiment, the computing device 102 includes a break avoidance apparatus 104. In the embodiment of the system 100 depicted in FIG. 1, the break avoidance apparatus 104 is shown in memory 104 of the computing device 102. In other embodiments, all or a portion of the break avoidance apparatus 104 are located in a different location, such as on a server 118, on an external storage device, etc. The break avoidance apparatus 104 will be discussed in more detail in relation to the apparatuses 200, 300 of FIGS. 2 and 3.

The system 100, in one embodiment, includes memory 106 and the break avoidance apparatus 104 may be stored in the memory 106. For example, the memory 106 may be non-volatile memory and the break avoidance apparatus 104 may be stored in the non-volatile memory. In another embodiment, the memory 106 may be volatile memory and the break avoidance apparatus 104 may be stored in the volatile memory to be accessible for execution by the processor 108. In another embodiment, the system 100 includes a computing device 102 with a processor 108, which may execute code associated with the break avoidance apparatus 104. In another embodiment the computing device 102 includes multiple processors 108.

In another embodiment, one or more processors external to the computing device 102 execute all or a portion of code associated with the break avoidance apparatus 104. For example, the server 118 may be part of a cloud computing environment and the break avoidance apparatus 104 may include at least a portion that executes on the cloud. In another embodiment, the computing device 102 may or may not include a processor 108 and all or a portion of the break avoidance apparatus 104 may be implemented with logic hardware, such as discrete logic components, a field programmable logic array ("FPGA"), an application specific integrated circuit ("ASIC"), etc. One of skill in the art will recognize other ways to implement a break avoidance apparatus 104 for a touchscreen 110.

In one embodiment, the system 100 includes a computer network 116 connected to the computing device 102. The computer network 116 may include a local area network ("LAN"), a wireless network, a fiber optic network, the internet, a wide area network ("WAN"), a storage area network ("SAN"), a near field communication ("NFC") network, a personal area network ("PAN"), etc. The computer network 116 may include two or more computer networks and may include servers, routers, switches, cabling, etc.

The system 100, in one embodiment, includes a server 118 in communication with the computing device 102 and, as mentioned above, all or a portion of the break avoidance apparatus 104 may be located external to the computing device 102 and may be located on the server 118. The server 118 may include a mainframe, a workstation, a desktop computer, a laptop computer, a workstation, a virtual machine, a cloud computing environment, etc. The server 118 may include two or more servers 118 and may include processors, memory, non-volatile storage, and other computer system components. For example, the server 118 may be accessible over the internet and may exchange data with the computing device 102 or may execute one or more applications on behalf of the computing device 102.

The touchscreen 110 includes an electronic display of information and includes a way to input information by a user touching a specific location on the touchscreen 110. For example, the touchscreen 110 may be part of a smartphone, a remote control, a tablet computer, or other handheld or fixed computing device 102. The touchscreen 110, in one embodiment, electronically displays information but does not include a way for a user to input information through touch. For example, the touchscreen 110 may be an electronic display and information is controlled by a device separate from the touchscreen 110, such as a mouse or keyboard. The touchscreen 110, in one embodiment, is controlled by a finger or body part of a user. In various embodiments, the touchscreen 110 is controlled using a stylus, a specially coated glove, a pen with an electronically controlled tip, such as on a point of sale credit card device, etc.

The touchscreen 110 includes damage 112. The damage 112 may include cracks in the touchscreen 110, defects, deformities, or other damage 112 that may distort information displayed under or around the damage 112 or may affect touch control of the touchscreen 110. The damage 112 may be a factory defect or may occur after leaving the factory, for example, when a user damages the touchscreen 110. The damage 112 may be included in an area of damage 114, which may include some boundary where the damage 112 is included within the area of damage 114. In one embodiment, all of the damage 112 is contained in the area of damage 114. In another embodiment, a portion of the damage 112 is located external to the area of damage 114. For example, a portion of the damage 112 may be considered to be minor and may be external to the area of damage 114.

The area of damage 114 may be any shape, such as a rectangle, a circle, an ellipse, may be a combination of shapes, etc. The area of damage 114, in one embodiment, is a custom shape. For example, the custom shape may closely encircle the damage 112, may traverse around cracks and breaks, etc.

The area of damage 114 will be discussed further in connection with the apparatuses 200, 300 of FIGS. 2 and 3.

Figure 2:
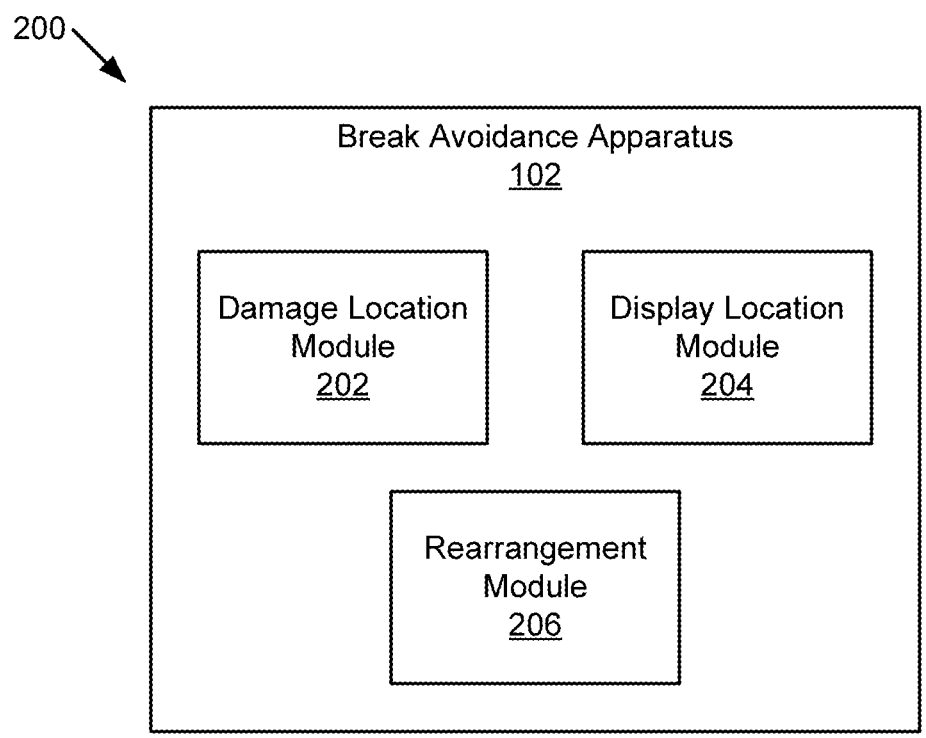
FIG. 2 is a schematic block diagram illustrating one embodiment of an apparatus for avoiding a damaged region on a touchscreen, in accordance with one embodiment of the present invention.

FIG. 2 is a schematic block diagram illustrating one embodiment of an apparatus 200 for avoiding a damaged region on a touchscreen 110, in accordance with one embodiment of the present invention. The apparatus 200 includes an embodiment of break avoidance apparatus 104 with a damage location module 202, a display location module 204, and a rearrangement module 206, which are described below.

The apparatus 200, in one embodiment, includes a damage location module 202 that determines a location of an area of damage 114 on a touchscreen 110 of a computing device 102. The area of damage 114 includes damage 112 to the touchscreen 110. The area of damage 114 may include all of the damage 112 or may exclude a portion of the damage 112. The area of damage 114 may include a specific shape, such as a rectangle, or may include a shape that closely mimics an outer boundary of the damage 112. In one embodiment, the area of damage 114 has edges located a minimum distance from the damage 112. The damage location module 202, in one embodiment, determines the location of the area of damage 114 by identifying a geographic region on the touchscreen 110, for example in relation to an area of display, to a top and bottom of the touchscreen 110, the sides of the touchscreen 110, etc. In another embodiment, the damage location module 202 locates the area of damage 114 by identifying certain pixels in the touchscreen 110. In one embodiment, the damage location module 202 determines more than one area of damage 114 on a touchscreen 110. Other ways for the damage location module 202 to locate the area of damage 114 are discussed in relation to the apparatus 300 of FIG. 3.

In one embodiment, the apparatus 200 includes a display location module 204 that determines a location of one or more display items commanded to be displayed on the touchscreen 110. Each display item includes a location to be displayed on the touchscreen 110. For example, the computing device 102 may compose information to be displayed on the touchscreen 110. The information may include data along with instructions of how to display the data. The data may include icons, lines, background, text, symbols, etc. and the instructions may include commands to light certain pixels on the touchscreen 110 a certain color and intensity. A display item may be an icon, a portion of text, an image, a shape, a background element, etc. that may be displayed on the touchscreen 110. In one embodiment, the display location module 204 determines a location of each display item on the touchscreen 110 prior to display of the display items.

The apparatus 200, in one embodiment, includes a rearrangement module 206 that alters a location of a display item to be displayed in the area of damage 114 where the display item is moved to a location on the touchscreen 110 outside the area of damage 114 on the touchscreen 110. For example, the rearrangement module 206 may determine that a location of a display item that has not yet been displayed is scheduled to be displayed within the area of damage 114 and may relocate the display item to an area outside of the area of damage 114. In another embodiment, the rearrangement module 206 relocates a display item that has been displayed in the area of damage 114 after the display item has been first displayed in the area of damage 114. In one embodiment, the rearrangement module 206 alters a location of a display item to avoid more than one area of damage 114. Various methods of rearranging the display items are discussed with regard to the apparatus 300 of FIG. 3.

Figure 3:
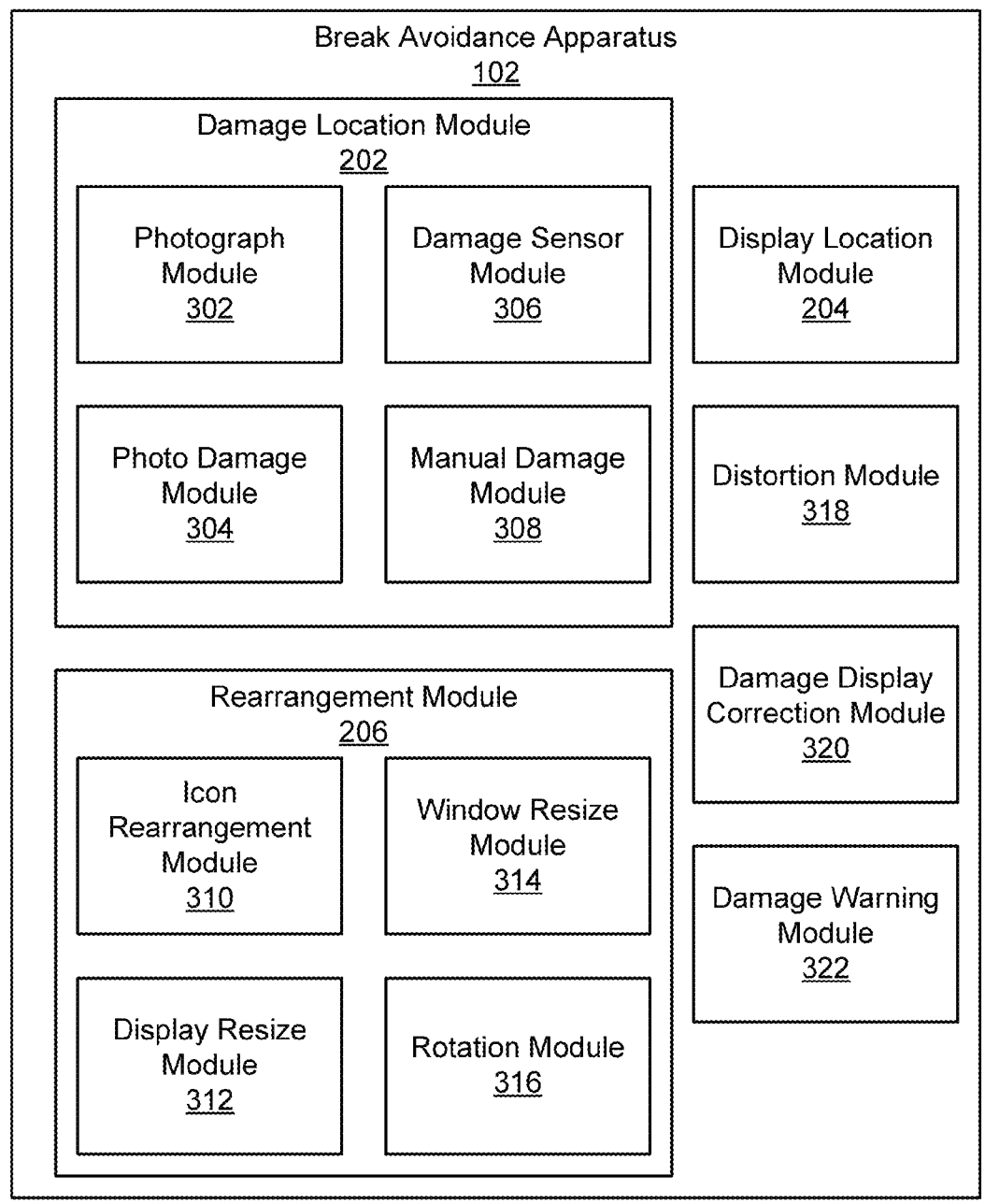
FIG. 3 is a schematic block diagram illustrating another embodiment of an apparatus for avoiding a damaged region on a touchscreen, in accordance with one embodiment of the present invention.

FIG. 3 is a schematic block diagram illustrating another embodiment of an apparatus 300 for avoiding a damaged region on a touchscreen 110, in accordance with one embodiment of the present invention. The apparatus 300, in one embodiment, includes another embodiment of the break avoidance apparatus 104 that includes a damage location module 202, a display location module 204, and a rearrangement module 206, which are substantially similar to those discussed in relation to the apparatus 200 of FIG. 2. The apparatus 300 also includes, in various embodiments, a photograph module 302 a photo damage module 304, a damage sensor module 306, and a manual damage module 308 in the damage location module 202, an icon rearrangement module 310, a display resize module 312, a window resize module 314, and a rotation module 316 in the rearrangement module 206, a distortion module 318, a damage display correction module 320, and a damage warning module 322, which are described below.

In one embodiment, the damage location module 202 includes a photograph module 302 and a photo damage module 304. The photograph module 302, in one example, receives a photograph of the touchscreen 110 and the photo damage module 304 determines from the photograph the area of damage 114 on the touchscreen 110. In one embodiment, the photograph module 302 works in conjunction with a user holding the computing device 102 so the touchscreen 110 is facing a minor or other reflective surface while the user takes a picture of the touchscreen 110 using a camera in the computing device 102. In another embodiment, the photograph module 302 receives a photo of the touchscreen 110, including the area of damage 114. For example, the user may take a photograph of the touchscreen with a separate camera and may send the photograph to the computing device 102 or to the apparatus 300 with the photograph module 302.

The photo damage module 304, in one embodiment, analyzes the photograph to determine the area of damage 114. In one example, the photo damage module 304 characterizes abnormalities of the touchscreen as damage 112 to determine the area of damage 114. In another example, the photo damage module 304 uses a first photograph of the touchscreen 110 prior to the damage 112 and compares the first photograph with a second photograph from the photograph module 302 to determine a location of damage 112 to then determine the area of damage 114. In another embodiment, the photo damage module 304 looks for areas on the touchscreen 110 that are indicative of damage 112. For example, the photo damage module 304 may exclude anomalies on the touchscreen 110 that may be indicative of fingerprints, debris, dirt, etc. and may characterize as damage 112, cracks, distortions, etc. that are typical of breaks, factory blemishes, etc.

In another embodiment, the damage location module 202 includes a damage sensor module 306 that determines the area of damage 114 using one or more sensors in the touchscreen 110. The one or more sensors detect damage to the touchscreen 110. For example, the touchscreen 110 may have sensors to detect changes to a regular electromagnetic field across the touchscreen 110. In one instance, the touchscreen 110 may include sensors that detect changes to the electromagnetic field due to a touch and the changes may be correlated to a location on the touchscreen 110. In another embodiment, the touchscreen 110 includes sensors that detect pressure and a location of the pressure. The touchscreen 110 may typically relay the changes due to touch and a location associated with the touch to the processor 108. The damage sensor module 306 may sense changes to typical electrical signals from the touchscreen 110 to determine an area of damage 114. For example, the damage sensor module 306 may determine that electrical signal changes are not transient or may detect specific changes to the electrical signals indicative of damage 112.

In another embodiment, the damage sensor module 306 includes sensors apart from sensors and signals typically used to determine touch on the touchscreen 110. For example, the damage sensor module 306 may include grid, a cover, a layer, etc. that is separate from the sensors and signals typically used to determine touch on the touchscreen 110 and the grid, cover, layer, etc. may be used solely for damage detection or may be used for other purposes as well. One of skill in the art will recognize other ways for the damage sensor module 306 to use one or more sensors to determine an area of damage 114.

In one embodiment, the damage location module 202 includes a manual damage module 308 that receives input from a user defining the area of damage 114. For example, the user may interact with the manual damage module 308 to draw around the damage 112 to establish the area of damage 114. In another embodiment, the manual damage module 308 may receive coordinates from the user to establish the area of damage 114. In another embodiment, the manual damage module 308 interacts with the user to receive the area of damage 114 where the user touches the damage 112. The manual damage module 308 may include graphical feedback to allow the user to enter and/or adjust the area of damage 114. In one embodiment, the manual damage module 308 interacts with the damage sensor module 306, the photo damage module 304, the damage location module 202, etc. to modify or override an area of damage 114 previously identified by the damage sensor module 306, the photo damage module 304, etc.

As mentioned above, the display items may include an icon or may also be a screen element, such as a window, a box, a background design, text, etc. In one embodiment, the rearrangement module 206 includes an icon rearrangement module 310 that moves an icon and/or a screen element to be displayed in the area of damage 114 to a location on the touchscreen 110 outside the area of damage 114. For example, where the rearrangement module 206 determines that the icon/screen element is to be displayed in the area of damage 114, the icon rearrangement module 310 moves the icon/screen element to a location outside the area of damage 114.

In one example, the icon rearrangement module 310 rearranges other icons and/or screen elements to accommodate the moved icon/screen element. In another example, the icon rearrangement module 310 moves the icon/screen element to an empty location that does not include an icon or screen element and also outside the area of damage 114. Where the rearrangement module 206 determines two or more icons are scheduled to be displayed in the area of damage 114, the icon rearrangement module 310 may move the two or more icons/screen elements to outside the area of damage 114.

In one embodiment, where the icon or screen element to be displayed in the area of damage 114 is used more than other icons or screen elements outside the area of damage 114, the icon rearrangement module 310 may move the icon/screen element to a location of a lesser used icon/screen element and may move the lesser used icon/screen element to the area of damage 114. In another embodiment, the rearrangement module 206 locates a display item to the area of damage 114 where the display item moved to the area of damage 114 is a display item that operates without user interaction through the touchscreen 110. For example, the display item may be an icon or screen element to be displayed in the area of damage 114 that may require touching by the user for input and the rearrangement module 206 and/or icon rearrangement module 310 may move the display item, icon, or screen element to another location outside the area of damage 114 and may move the display item not requiring user interaction to the area of damage 114.

In one embodiment, the rearrangement module 206 includes a display resize module 312 that resizes information to be displayed on the touchscreen 110 to avoid the area of damage 114. For example, the display resize module 312 may shrink the information to be displayed on the touchscreen 110 in one dimension or two dimensions to avoid the area of damage 114. In another embodiment, the display resize module 312 resizes a portion of the information to be displayed on the touchscreen 110.

In another embodiment, the display item to be displayed in the area of damage 114 includes a window and the rearrangement module 206 includes a window resize module 314 that resizes the window to avoid the area of damage 114. For example, the touchscreen 110 may include one or more windows in an area where information is displayed on the touchscreen 110. The window resize module 314 may resize a window to be displayed in the area of damage 114 so the window avoids the area of damage 114 while the size of the display on the touchscreen 110 remains unchanged. In another embodiment, the rearrangement module 206 moves the window without resizing the window.

In another embodiment, the rearrangement module 206 includes a rotation module 316 that rotates a display on the touchscreen 110 independent of an accelerometer of the computing device 102. Often a computing device 102 will include an accelerometer that senses when a user rotates the computing device 102 and the computing device will rotate the display on the touchscreen 110. The rotation module 316 rotates the display without the accelerometer sensing any rotation, and after rotating the display, the display item to be displayed in the area of damage 114 is located in an area outside the area of damage 114. In another embodiment, the rotation module 316 rotates the display and also rotates display items in the display. For example, if the rotation module 316 rotates the display clockwise 90 degrees, the rotation module 316 may also rotate the display items 90 degrees counterclockwise so the display items appear upright after the rotation.

Often display items in the area of damage 114 have portions that may appear brighter or distorted due to the damage 112. For example, where the damage 112 includes cracks in the touchscreen 110, the display items under the cracks may appear brighter or distorted and draw attention to the display items. In another embodiment, display items in the area of damage 114 may include lines that are distorted. In one embodiment, the apparatus 300 includes a distortion module 318 that lowers an output resolution of a display item in the area of damage 114 to a level to decrease distortion of the display item due to the damage 112. Lowering resolution may smooth lines or otherwise have an effect of decreasing distortion of the display item in the area of damage 114.

In another embodiment, the apparatus 300 includes a damage display correction module 320 that changes a font size and/or a color of a display item displayed in the area of damage 114 to adjust for distortion due to the damage 112. For example, a display item under the damage 112 may have text with a font that is difficult to read due to distortion caused by the damage and the damage display correction module 320 may increase the font size of text in the area of damage 114 or under the damage 112 to make the text more readable. In another embodiment, the damage display correction module 320 increases a font size of all text on the display of the touchscreen 110 to adjust for distortion caused by the damage 112. In another example, the damage 112 may cause distortion or color change and the damage display correction module 320 compensates by changing color of the display item. One of skill in the art will recognize other ways that the damage display correction module 320 may change a color, a font, or other display characteristic to compensate for distortion caused by the damage 112.

In another embodiment, the apparatus 300 includes a damage warning module 322 that sends an alert in response to a user and/or an application attempting to locate a display item in the area of damage 114. For example, if the user attempts to drag an icon to the area of damage 114, the damage warning module 322 may send a warning to the user or to the application associated with the icon. In one example, the warning triggers actions by the bread avoidance apparatus 102 to move the icon, to compensate for distortion, etc. In another example, the damage warning module 322 triggers a message, triggers an audible sound or warning, etc. to alert the user so the user may locate the display item in another location. In another example, the damage warning module 322 sends a warning to an application associated with the display item, to a system application, etc. and the application does not permit movement of the display item to the area of damage 114.

Figure 4A:
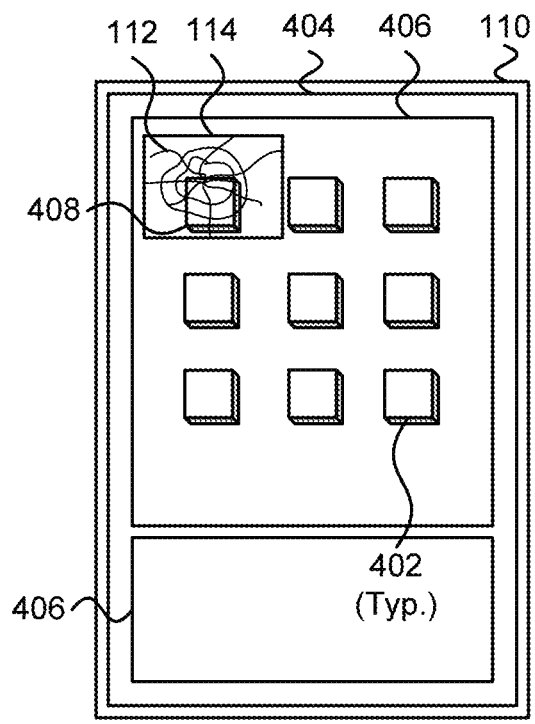
FIG. 4A is a schematic block diagram illustrating a touchscreen with a damaged region.
Figure 4B:
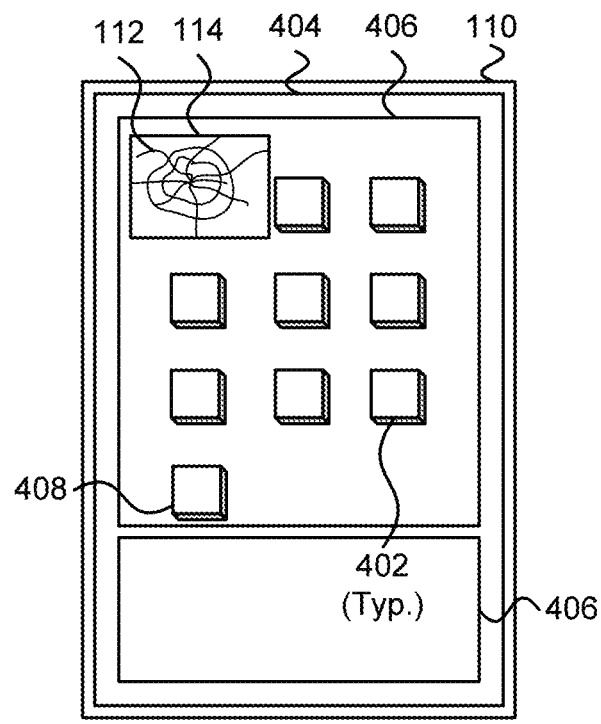
FIG. 4B is a schematic block diagram illustrating the touchscreen with a damaged region and relocated icons.

FIG. 4A is a schematic block diagram illustrating a touchscreen 110 with a damaged region and a display item, in this case an icon 408, in the area of damage 114. FIGS. 4B-4E illustrate various methods of relocating a display item to not be in the area of damage. The damaged region includes damage 112 which is encompassed by an area of damage 114. The touchscreen 110 includes icons 402 on a display 404 and windows 406. Note that one display item, in this case an icon 408, is in the area of damage 114. FIG. 4B is a schematic block diagram illustrating the touchscreen 110 with a damaged region and relocated icons 402. For example, the icon rearrangement module 310 may relocate the icon 408 in the area of damage 114 to another location or may shift a row of icons so that no icons 402 are in the area of damage 114.

Figure 4C:
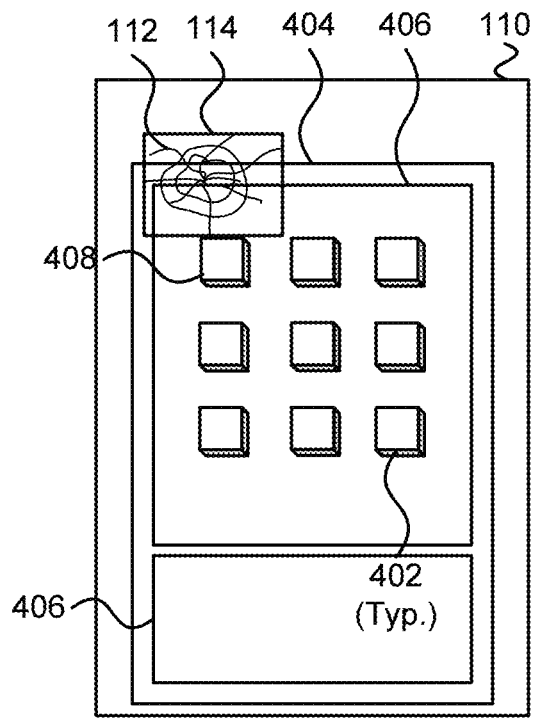
FIG. 4C is a schematic block diagram illustrating the touchscreen with a damaged region and a resized display.
Figure 4D:
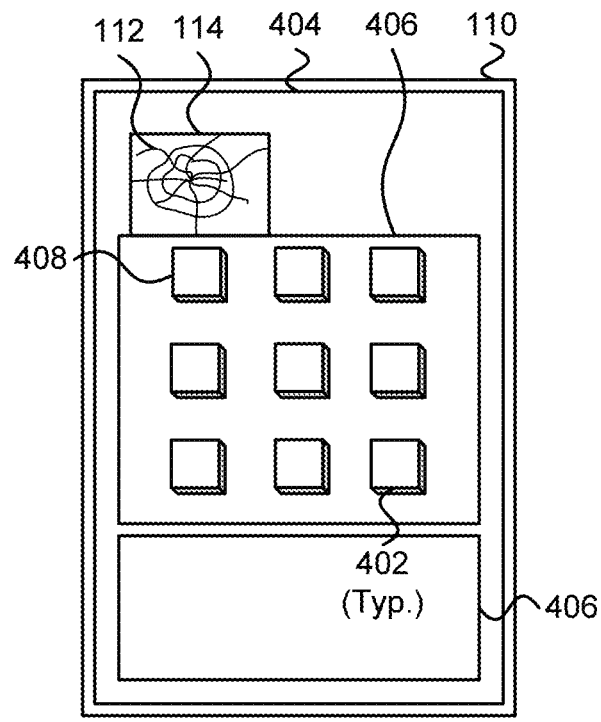
FIG. 4D is a schematic block diagram illustrating the touchscreen with a damaged region and a resized window.

FIG. 4C is a schematic block diagram illustrating the touchscreen 110 with a damaged region and a resized display 404. In the embodiment, the display resize module 312 may shrink the display 404 so that the icon 408 is just outside the area of damage 114. In another embodiment, the display resize module 312 may resize the display so a window 406 or the entire display 404 is outside the area of damage 114. FIG. 4D is a schematic block diagram illustrating the touchscreen 110 with a damaged region and a resized window 406. For example, the window resize module 314 may resize the window 406 that covers the area of damage 114. In one embodiment, the window resize module 314 resizes the window 406 so the display item/icon 408 in the area of damage 114 is just outside the area of damage 114. The display 404, in one embodiment, may remain the same size. In another embodiment, the window resize module 314 resizes the window 406 so that the entire window 406 is outside the area of damage 114.

Figure 4E:
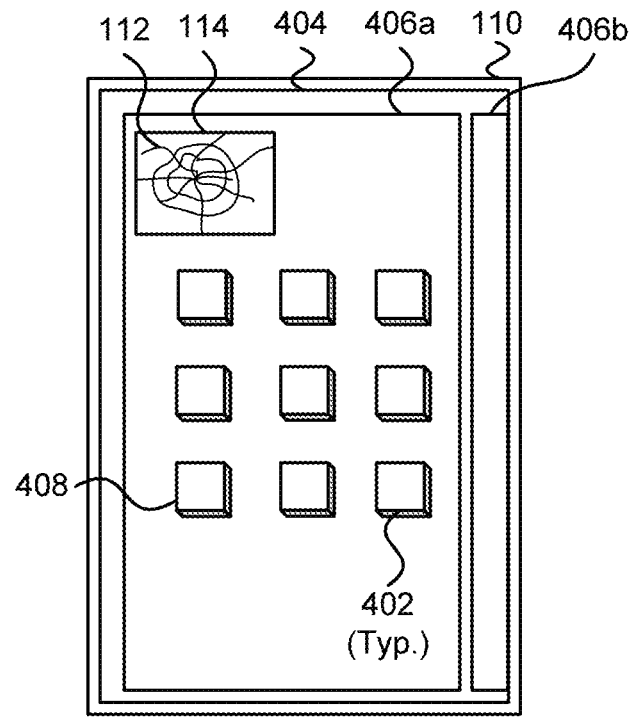
FIG. 4E is a schematic block diagram illustrating the touchscreen with a damaged region and a rotated display.

FIG. 4E is a schematic block diagram illustrating the touchscreen 110 with a damaged region and a rotated display 404. For example, the rotation module 316 may rotate the display 404 when a display item/icon 408 is in the area of damage 114. In the example depicted in FIG. 4E, the display 404 may be rotated counterclockwise so that the window 406a with the display item/icon 408 in the area of damage 114 is rotated and icons 402 are shifted so no icons 402 are in the area of damage 114. Another window 406b may be rotated and resized as well and may remain below the first window 406a and the display 404 may need to be scrolled to view the second window 406b.

Figure 5:
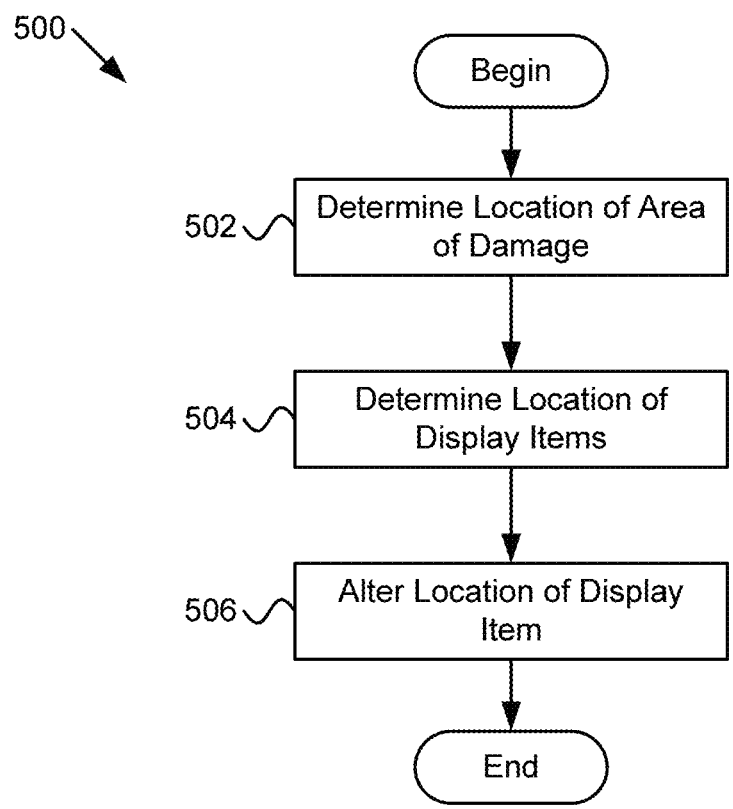
FIG. 5 is a schematic flow chart diagram illustrating one embodiment of a method for avoiding a damaged region on a touchscreen in accordance with one embodiment of the present invention.

FIG. 5 is a schematic flow chart diagram illustrating one embodiment of a method 500 for avoiding a damaged region on a touchscreen 110 in accordance with one embodiment of the present invention. The method 500 begins and determines 502 a location of an area of damage 114 on a touchscreen 110 of a computing device 102. The area of damage 114 includes damage 112 to the touchscreen 110. In one embodiment, the method 500 determines 502 the location of the area of damage 114 by examining a photograph of the touchscreen 110. For example, the method 500 may include taking a photograph of the touchscreen 110 using a camera on the computing device 102 and a minor. In another embodiment, the method 500 compares a photograph taken prior to the damage 112 to a photograph taken after the damage 112 to determine 502 the location of the area of damage 114. In one embodiment, the method 500 may use the damage location module 202 and may also use the photograph module 302 and the photo damage module 304 to determine 502 the location of the area of damage 114.

In another embodiment, the method 500 determines 502 the location of the area of damage 114 using one or more sensors. For example, the method 500 may use the damage sensor module 306 to determine 502 the location of the area of damage 114 using sensors. In another embodiment, the method 500 determines 502 the location of the area of damage 114 based on user input. For example, the method 500 may use the manual damage module 308 to receive user input.

The method 500 determines 504 a location of one or more display items commanded to be displayed on the touchscreen 110. Each display item includes a location to be displayed on the touchscreen 110. The method may use the display location module 204 to determine 504 a location of the one or more items commanded to be displayed on the touchscreen 110. The method 500 alters 506 a location of a display item to be displayed in the area of damage 114 so that the display item is moved to a location on the touchscreen 110 outside the area of damage 114 on the touchscreen 110, and the method 500 ends. For example, the method 500 may alter 506 a location of an icon 408 that is to be displayed in the area of damage 114 so that the icon 408 is outside the area of damage 114. The method 500 may use the icon rearrangement module 310 to alter 506 the location of the icon 408.

In another embodiment, the method 500 resizes the display 404 of the touchscreen 110 so that the display item is not in the area of damage 114. The method 500, for example, may use the display resize module 312 to resize the display 404. In another embodiment, the method 500 may resize a window 406 so that the display item is not in the area of damage 114. For example, the method may use the window resize module 314 to resize the window 406. In another embodiment, the method 500 rotates the display 404 so that the display item is not in the area of damage 114. The method 500 may use the rotation module 316 to rotate the display 404. The method 500 may use more than one of the above mentioned techniques to alter a location of the display item so that the display item is not in the area of damage 114.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
  a damage location module that determines a location of an area of damage on a touchscreen of a computing device, the area of damage comprising damage to the touchscreen, the damage location module further comprising
a photograph module that receives a photograph of the touchscreen; and
a photo damage module that determines from the photograph the area of damage on the touchscreen;
a display location module that determines a location of one or more display items commanded to be displayed on the touchscreen, each display item comprising a location to be displayed on the touchscreen; and
a rearrangement module that alters a location of a display item to be displayed in the area of damage wherein the display item is moved to a location on the touchscreen outside the area of damage on the touchscreen,
wherein at least a portion of the damage location module, the display location module, and the rearrangement module comprise one or more of hardware and executable code, the executable code stored on one or more computer readable storage media.

2. The apparatus of claim 1, wherein the photograph module further comprises taking a photograph of the touchscreen in response to a user positioning the computing device in front of a mirror and pressing a photograph button.

3. The apparatus of claim 1, wherein the display item to be displayed in the area of damage comprises one or more of an icon and a screen element and wherein the rearrangement module further comprises an icon rearrangement module that moves one or more of an icon and a screen element to be displayed in the area of damage to a location on the touchscreen outside the area of damage.

4. The apparatus of claim 3, wherein the icon or screen element to be displayed in the area of damage comprises an icon or screen element used more than an icon or screen element outside the area of damage and the icon rearrangement module moves one or more of an icon and screen element used less than the icon or screen element to be displayed in the area of damage to the area of damage.

5. The apparatus of claim 1, wherein the rearrangement module further locates a display item to the area of damage wherein the display item moved to the area of damage comprises a display item that operates without user interaction through the touchscreen.

6. The apparatus of claim 1, wherein the rearrangement module further comprises a display resize module that resizes information to be displayed on the touchscreen to avoid the area of damage.

7. The apparatus of claim 1, wherein the display item to be displayed in the area of damage comprises a window and the rearrangement module further comprises a window resize module that resizes the window to avoid the area of damage.

8. The apparatus of claim 1, wherein the rearrangement module further comprises a rotation module that rotates a display on the touchscreen independent of an accelerometer of the computing device wherein after rotating the display, the display item to be displayed in the area of damage is located in an area outside the area of damage.

9. The apparatus of claim 1, further comprising a distortion module that lowers an output resolution of a display item in the area of damage to a level to decrease distortion of the display item due to the damage.

10. The apparatus of claim 1, further comprising a damage display correction module that changes one or more of a font size and a color of a display item displayed in the area of damage to adjust for distortion due to the damage.

11. The apparatus of claim 1, further comprising a damage warning module that sends an alert in response to one or more of a user and an application attempting to locate a display item in the area of damage.

12. The apparatus of claim 1, further comprising:
the computing device;
a processor in the computing device; and
the touchscreen, wherein the processor is operable to display the display items on the touchscreen.

13. A method comprising:
receiving a photograph of the touchscreen;
determining, using the photograph, a location of an area of damage on a touchscreen of a computing device, the area of damage comprising damage to the touchscreen;
determining a location of one or more display items commanded to be displayed on the touchscreen, each display item comprising a location to be displayed on the touchscreen; and
altering a location of a display item to be displayed in the area of damage wherein the display item is moved to a location on the touchscreen outside the area of damage on the touchscreen.

14. The method of claim 13, wherein altering a location of a display item to be displayed in the area of damage further comprises one or more of:
wherein the display item to be displayed in the area of damage comprises one or more of an icon and a screen element and further comprising moving one or more of an icon and a screen element to be displayed in the area of damage to a location on the touchscreen outside the area of damage;
resizing information to be displayed on the touchscreen to avoid the area of damage;
wherein the display item to be displayed in the area of damage comprises a window and further comprising resizing the window to avoid the area of damage; and
rotating a display on the touchscreen independent of an accelerometer of the computing device wherein after rotating the display, the display item to be displayed in the area of damage is located in an area outside the area of damage.

15. A computer program product comprising a non-transitory computer readable storage medium having program code embodied therein, the program code readable/executable by a processor for:
receiving a photograph of the touchscreen;
determining, using the photograph, a location of an area of damage on a touchscreen of a computing device, the area of damage comprising damage to the touchscreen;
determining a location of one or more display items commanded to be displayed on the touchscreen, each display item comprising a location to be displayed on the touchscreen; and
altering a location of a display item to be displayed in the area of damage wherein the display item is moved to a location on the touchscreen outside the area of damage on the touchscreen.

16. An apparatus comprising:
a damage location module that determines a location of an area of damage on a touchscreen of a computing device, the area of damage comprising damage to the touchscreen;
a display location module that determines a location of one or more display items commanded to be displayed on the touchscreen, each display item comprising a location to be displayed on the touchscreen; and a rearrangement module that alters a location of a display item to be displayed in the area of damage wherein the display item is moved to a location on the touchscreen outside the area of damage on the touchscreen, the rearrangement module further comprising a rotation module that rotates a display on the touchscreen independent of an accelerometer of the computing device, wherein after rotating the display, the display item to be displayed in the area of damage is located in an area outside the area of damage;

wherein at least a portion of said modules comprise one or more of hardware and executable code, the executable code stored on one or more computer readable storage media.

17. The apparatus of claim 16, wherein the damage location module further comprises:
a photograph module that receives a photograph of the touchscreen; and
a photo damage module that determines from the photograph the area of damage on the touchscreen.

18. The apparatus of claim 17, wherein the photograph module further comprises taking a photograph of the touchscreen in response to a user positioning the computing device in front of a mirror and pressing a photograph button.

19. The apparatus of claim 16, wherein the damage location module further comprises a damage sensor module that determines the area of damage using one or more sensors in the touchscreen, the one or more sensors detecting damage to the touchscreen.

20. The apparatus of claim 16, wherein the damage location module further comprises a manual damage module that receives input from a user defining the area of damage.

21. The apparatus of claim 16, wherein the display item to be displayed in the area of damage comprises one or more of an icon and a screen element and wherein the rearrangement module further comprises an icon rearrangement module that moves one or more of an icon and a screen element to be displayed in the area of damage to a location on the touchscreen outside the area of damage.

22. The apparatus of claim 16, wherein the rearrangement module further locates a display item to the area of damage wherein the display item moved to the area of damage comprises a display item that operates without user interaction through the touchscreen.

23. The apparatus of claim 16, wherein the rearrangement module further comprises a display resize module that resizes information to be displayed on the touchscreen to avoid the area of damage.

24. The apparatus of claim 16, further comprising a distortion module that lowers an output resolution of a display item in the area of damage to a level to decrease distortion of the display item due to the damage.

25. The apparatus of claim 16, further comprising a damage display correction module that changes one or more of a font size and a color of a display item displayed in the area of damage to adjust for distortion due to the damage.

26. The apparatus of claim 16, further comprising:
the computing device;
a processor in the computing device; and
the touchscreen, wherein the processor is operable to display the display items on the touchscreen.

27. A method comprising:
determining a location of an area of damage on a touchscreen of a computing device, the area of damage comprising damage to the touchscreen;
determining a location of one or more display items commanded to be displayed on the touchscreen, each display item comprising a location to be displayed on the touchscreen; and
altering a location of a display item to be displayed in the area of damage wherein the display item is moved to a location on the touchscreen outside the area of damage on the touchscreen, wherein altering the location of the display item to be displayed in the area of damage further comprises rotating a display on the touchscreen independent of an accelerometer of the computing device, wherein after rotating the display, the display item to be displayed in the area of damage is located in an area outside the area of damage.

28. The method of claim 27, further comprising receiving a photograph of the touchscreen and determining from the photograph the area of damage on the touchscreen.

29. The method of claim 27, further comprising one or more of:
determining the area of damage using one or more sensors in the touchscreen, the one or more sensors detecting damage to the touchscreen, and
receiving input from a user defining the area of damage.

30. A computer program product comprising a non-transitory computer readable storage medium having program code embodied therein, the program code readable/executable by a processor for:
determining a location of an area of damage on a touchscreen of a computing device, the area of damage comprising damage to the touchscreen;
determining a location of one or more display items commanded to be displayed on the touchscreen, each display item comprising a location to be displayed on the touchscreen; and
altering a location of a display item to be displayed in the area of damage wherein the display item is moved to a location on the touchscreen outside the area of damage on the touchscreen, wherein altering the location of the display item to be displayed in the area of damage further comprises rotating a display on the touchscreen independent of an accelerometer of the computing device, wherein after rotating the display, the display item to be displayed in the area of damage is located in an area outside the area of damage.

* * * * *